United States Patent [19]

Schulz

[11] 4,032,501
[45] June 28, 1977

[54] DRY-BLENDABLE SOLUTION RUBBER POWDERS AND PROCESS

[75] Inventor: Donald Norman Schulz, Hartville, Ohio

[73] Assignee: The Firestone Tire & Rubber Company, Akron, Ohio

[22] Filed: July 11, 1975

[21] Appl. No.: 594,985

[52] U.S. Cl. .............. 260/33.6 AQ; 260/29.7 PT; 260/34.2; 260/42.47; 260/42.55
[51] Int. Cl.² ................ C08K 3/04; C08K 5/01
[58] Field of Search ........... 260/29.7 PT, 33.6 AQ, 260/34.2, 42.47, 42.55

[56] References Cited

UNITED STATES PATENTS

| | | | |
|---|---|---|---|
| 3,441,530 | 4/1969 | Bauer et al. | 260/33.6 AQ |
| 3,846,365 | 11/1974 | Berg et al. | 260/33.6 AQ |
| 3,895,035 | 7/1975 | Berg et al. | 260/33.6 AQ |
| 3,922,240 | 11/1975 | Berg et al. | 260/33.6 AQ |
| 3,929,707 | 12/1975 | Berg et al. | 260/29.7 T |
| 3,945,978 | 3/1976 | Berg et al. | 260/33.6 AQ |

FOREIGN PATENTS OR APPLICATIONS

| | | | |
|---|---|---|---|
| 739,548 | 7/1966 | Canada | 260/29.7 PT |
| 1,470,924 | 8/1970 | Germany | |
| 2,325,550 | 12/1974 | Germany | |
| 1,228,836 | 4/1971 | United Kingdom | |

OTHER PUBLICATIONS

Nordsiek et al. –Kautschuk und Gummi–Kunststoffe No. 7, pp. 397–402 (1975).

Primary Examiner—Donald E. Czaja
Assistant Examiner—H. H. Fletcher

[57] ABSTRACT

Homogeneous, storage-stable dry-blendable hydrocarbon solution rubber powders containing carbon black, hydrocarbon solution rubber, and, foam inhibiting surfactant, said solution powders being of a mean particle size from 0.8 to 1.5 mm., about one-half of said particles having a particle size greater than 1.0 mm.; total powder blends thereof, and, their respective preparations.

2 Claims, No Drawings

DRY-BLENDABLE SOLUTION RUBBER POWDERS AND PROCESS

BACKGROUND OF THE INVENTION

To date solution rubber powders and their preparation have received comparatively little attention. This approach provides an economically attractive and advantageous procedure for preparing solution SBR powders and total powder blends thereof. This resulting total blended composition performs significantly, for example, in tire tread formulations and is one which is produced with a minimum of energy consumption and substantially reduced dust hazard in terms of both inhalation by workers and potential explosion hazard. A significant reduction in the amount of energy required is achieved and the final total composition, for example, results in excellent tire tread performance as evidenced in this specification. Hydrocarbon solution SBR powder compounds are directly processed, that is, without prior compacting or milling via, for example, a simple single screw rubber extruder with low L/D ratios.

Both the solution rubber powder and the total compounded composition produced as a result of this invention are free flowing the requirement for substantial post blending shear is eliminated.

Utility for the totally compounded solution rubber powder blend is found in the production of, for example, injection molded articles, extruded exterior coatings in electric cable construction, tire construction, and, the preparation of gaskets for hose and pipe which can be utilized in both automotive and home construction.

Within the context of the present invention, the term hydrocarbon rubber solution describes hydrocarbon solutions of non polar rubbers, especially those which have been prepared by solution polymerization; examples thereof include solution SBR, solution polybutadiene, solution EPDM and solution EP. The viscosities of said rubbers are not critical to their performance in the practice of this invention; they can be either high or low. For example, the DSV's and $ML_{4 \, 1\text{n. c.}}$ of any such rubber can be between 1.5-7.0 and 20-180, respectively. DSV is defined as dilute solution viscosity and $ML_{4 \, 1\text{n. t.}}$ is defined by Mooney viscosity. Both methods are related to the molecular weight of the rubbers and are commonly used in the art for designating the molecular weight or viscosity of rubbery materials. The Mooney measurement is the most convenient measurement for the range of about 20-180, while the DSV measurement is more applicable for very low and very high viscosity elastomers; the preferred range is from 35 to 110.

Below 1.5 DSV, minimal rubber properties are evidenced and as the DSV increases up to 7.0 DSV, the higher viscosity increases reflect increased difficulty in processing; the preferred DSV range is from 1.8 to 3.0 as a result of which rubbery properties in the product and processing are optimized.

Prior Art

Pertinent prior art, which art does not singly or collectively suggest the herein described and claimed rubber powder compositions and/or processes for preparing same, was found in the following patents and publication article: U.S. Pat. Nos. 2,777,008; 3,245,945; 3,203,922; 3,060,145; 3,251,798; Ger. Offen. No. 2,214,121, and, British Pat. No. 1,387,605. The publication article is found in the "European Rubber Journal" Oct. 1974, pages 52 to 69.

Unsatisfactory features of the prior art include:
 a. free carbon black - visible to the eye;
 b. high ash content from use of inorganics;
 c. initial milling required (i.e. crumb rubber proc.);
 d. high degree of shear in a heavy complex extruder;
 e. higher total energy requirement; and,
 f. more complex system is required.

My improvements accomplished include:
1. substantially free of unincorporated carbon black.
2. very low ash content as use no inorganics.
3. significantly low processing temperature to reduce energy requirements.
4. no PH control required.
5. no cure rate changing materials, such as inorganic silica, required.
6. totally compounded composition can be directly extruded with a minimum of shear and with no prior milling.
7. carbon black is homogeneously distributed and functions to effectively reinforce.
8. direct extrusion can be with a simple single screw rubber extruder.
9. no prior milling required at my intermediate compounding step.

In addition to the preceding improvements, the solution rubber powder of this invention is non-tacky, i.e., resists agglomeration and cold-flow.

The solution rubber powders of this invention are free-flowing in contrast to uncompounded emulsion rubber powders. These emulsion rubber powders also require substantial post-blending shear to achieve acceptable filler dispersion; the need for such substantial shear is eliminated in the practice of this invention.

My solution powder rubber is one prepared by directly mixing the rubber solution with an aqueous dispersion of carbon black to form a two-phase system: (A) rubber/black/hydrocarbon; (B) water; there is no need to make an aqueous emulsion (latex) of rubber first as is required, for example, in the process of British Pat. No. 1,387,605.

One nonionic class of surfactant that can be utilized in the practice of the present invention is known as low foaming nonionic polyether alcohol surfactants with blocked terminal hydroxyl group. Such modified materials are polyethoxy adducts or polyethers and are distinguished from higher foaming conventional polyether alcohol surfactants in Rohm and Haas Bulletins CS-60F/cg and CS-16G/cg.

Another class of surfactant that can be utilized in the practice of the present invention is that known as cationic tetraalkylammonium salts with more than 25 carbon atoms in the cation. This is Class III A10.2: Rosen & Goldsmith, *Systematic Analysis of Surface Active Agents*, page 517, Volume 12 of *Analytical Chemistry and Its Applications*, Wiley-Interscience, 1972, New York.

The surfactant utilized can be mixed or blended with another surfactant of the two classes herein designated. From 0.01 to 5.0 (phr) can be utilized; 0.5 to 1.5 (phr) is preferred. The minimal amount utilized is that required to inhibit formation of foam and functions to assist in the control of particle size in a particular selected system; this amount can be routinely determined by one skilled in the art with a minimum of routine experimentation.

If the mean particle size of the powdered rubber exceeds the amount specified, it increases the difficulty of powder blending and if the mean particle size is below that specified, the increase of the possibility for dust hazard is evidenced.

Preparation of Solution SBR/Black Powders

The carbon black was ground (fluffed) thoroughly in water and subsequently blended with the SBR cement to form a two phase dispersion of (1) hydrocarbon solvent, black, and rubber and (2) water. This dispersion was desolventized in hot water (85–95° C.) in the presence of a suitable surfactant. Particle size was adjusted by black level, surfactant level (and type), cement concentration and dispersion mixing temperature. Solution SBR/black powders were isolated by filtration and dried under vacuum.

Preparation of Powder (Dry) Blends

Pigments, oil and curatives were dry blended with the solution SBR/black powders in a Waring Blender or a Prodex-Henschel mixer. Usually, a 2.5–5 minute cycle (with cooling) was used.

Processing of Powder Blends

Powder blends were processed on a two roll mill, C. W. Brabender Plasticorder with an extrusion head (L/D = 10:1; compression ratio 2:1), Banbury mixer, and surprisingly on a Clinefelter ribbon tread extruder (L/D = 11:1, compression ratio 2:1).

Powder processing of rubber has many advantages (e.g., automated weighing and handling, reduced compound heat history, etc.), most known comminuted rubber compounds require substantial additional shear in order to achieve acceptable filler reinforcement. Conspicuously absent from the literature are reports of the direct single-pass simple extrusion of elastomer powders to form, for example, tire treads.

Solution SBR/Black Masterbatch Powders

Customarily, the solution masterbatching of elastomers results in products of crumb size. Rubber/black (optionally oil extended) masterbatch crumbs are characterized by excellent filler dispersion and distribution but requires conventional heavy duty (high energy) mixing equipment (e.g. mills, Banburys, etc.) for the incorporation of other pigments and curatives. On the other hand, complete solution masterbatches suffer the attendant disadvantages of accelerator hydrolysis and premature cure.

In order to circumvent the shortcomings of both partial and complete solution masterbatching, and also to advantageously apply powder processing, I mix rubber and filler as solution masterbatches and isolate such materials as powders. These products are subsequently dry blended with oil and other ingredients to form totally compounded powders.

To prepare powdered solution SBR/black masterbatches, I thoroughly grind (fluff) carbon black in water and add the resulting mixture to a surfactant containing rubber cement, (hydrocarbon solution). The hydrocarbon solvent/black/rubber and water (two phase) dispersion is powdered by hot water desolventization, filtered and dried. The particle size of the product depends upon a number of factors, such as black level, the type and level of surfactant, the cement concentration and the dispersion mixing temperature. By judicious control of these variables, fine particle-sized masterbatches can be realized.

For example, the particle size of solution SBR/black masterbatches decreases precipitously above the 10 phr level of carbon black; above 50–60 phr carbon black, the change is less pronounced. Particle size also decreases with increasing surfactant concentration; however above 3.0 phr the effect is minimal.

Powdered Total Compounds

Powdered solution SBR/black masterbatches can be dry blended with oil and other compounding ingredients in high speed/low shear mixers, such as Waring Blenders or Henschel mixers. Since a mixing sequence of solution masterbatching of filler plus powder blending of other compounding agents is so different from conventional rubber mixing, it is not surprising that powdered rubber blends and slab (bale) rubber mixes have distinct rubber/filler characteristics and different physical and rheological properties.

One interesting feature of such powder blends is their low bound rubber content (e.g., 17.7%) as compared to slab rubber mixed (e.g., 39.6%). This result probably reflects the lower shear history of solution masterbatching and dry blending vs. solid rubber mixing. Lower energy input would tend to minimize aggregate breakdown and/or free radical formation. In turn, less filler aggregation and/or fewer free radicals would tend to reduce the number of polymer chains which could become attached (physically and/or chemically) to the carbon black particles. Yet, despite the lower bound rubber content, the powder blends have excellent microscopic filler dispersion. Presumably, the solution masterbatching results in intimate mixing of filler and rubber with a minimum of energy consumption. Also, such powder rubber blends tend to have somewhat stiffer rheological properties (e.g., higher complex modulus, Mooney viscosity, etc.) than conventional rubber mixes.

Vulcanizate Quality-Processing Effects

Dry blends of powdered solution SBR/black masterbatches have been processed by a number of methods, including millsheeting, Banbury mixing, and direct (no prior compacting) extrusion in Brabender and ribbon tread extruders. Each means of rubber processing has its own shear characteristics and hence its own effect on physical properties. In general, the stiffness of powder blends tends to persist in the vulcanizate, regardless of the mode of processing. However, the extent of stiffness is reduced with increasing shear treatment.

Dry blends of powdered solution SBR/black masterbatches can be mill sheeted to give vulcanizate properties which are not greatly different from Banbury-mixed slab controls. The small deviations are in the direction of increased stiffness. The fewer the passes, the more pronounced these differences become. Mill sheeting can be avoided altogether if direct extrusion is utilized.

It was decided that a ribbon tread extrusion compression ratio 2:1, L/D = 11/1 temperature of 60° C. and a screw speed of 100 rpm best balanced the desired properties. A laboratory evaluation of a powdered tread composition, processed at these conditions, is shown in Table V. These data evince that the hardness of powdered vulcanizate can be reduced and the rebound increased by such variations in extrusion conditions.

However, the higher inherent plasticity of the powder persists.

As used herein, the term "consisting essentially of" has its generally accepted meaning as requiring that the specified components be present, but not excluding unspecified components which do not materially detract from the basic and novel characteristics of the composition and process as disclosed.

The characterization that the DSV (dilute solution viscosity) is within a certain range is one that ensures optimal rubbery properties in the final end use product. If the DSV is below 1.5, minimal rubbery properties are achieved, and DSV's about 7.0 result in higher viscosities and increasing difficulties in processing to thus give non-uniform (non-homogeneous) products. This DSV procedure is outlined, for example, in U.S. Pat. No. 3,824,206.

The carbon black filler component can be present in an amount from 50 to 150 parts by weight, 60–90 parts by weight being preferred. The performance of the resulting composition is enhanced with an increase in the fineness of the particles of carbon within the specified range.

The specified surfactant classes encompass specific surfactants which can be utilized in an amount from about 0.01 to 5.0 parts by weight, 0.5 to 1.5 parts by weight being preferred. The minimal amount of surfactant to be used is that amount which inhibits formation of foam in a particular selected system and minimizes particle size.

The mean particle size for the hydrocarbon solution rubber is specified to be between about 0.8 to 1.5; below 0.8 mean particle size increases the possibility of dust formation and hazard such as explosion. Above 1.5 mean particle size results in increased difficulty in achieving the desired powdered state.

The process step of mixing at about 20° C. to about 150° C., room temperature to 60° C. being preferred, is a practical temperature range, the use of a temperature below 20° C. reflects a viscosity increase which makes it difficult to achieve effective mixing; above 150° C. is impractical.

The hydrocarbon solution of non-polar rubber is prepared in an amount from about 5 to 25% by weight, 15 to 20% by weight being preferred. Below 5% by weight solution rubber does not result in acceptable economical manufacturing rates (through-put) to the system and above 25% by weight results in a viscosity increase leading to mixing problems.

The mixing rate can be conducted within the range of about 150 to about 1500 grams per minute; about 360 to 1270 grams per minute is preferred; rates below the lower limit result in low throughput; rates above upper limit result in control problems within the physical context of the composition being so processed.

The oil additive can be added at from 20 to 100 phr; 45 to 60 phr is preferred; said oil additive can be an aromatic oil, an aliphatic oil or other plasticizer. The pigment added functions as a protective material and is represented by waxes, antioxidants, etc.; it is added at a rate of 0.1 to 10 phr. The curative additive component can be sulfur, an accelerator, an activator, etc., and is added at a rate of from 0.1 to 10 phr.

The carbon black can be any known carbon black, preferred, examples thereof being HS/HAF black, ISAF black and other known carbon blacks.

Hydrocarbon solution rubbers which can be utilized exclude polar rubbers and latex rubbers such as nitrile rubber. Hydrocarbon soluble rubber and solution polymerized rubber with Mooney viscosities ($ML_{4,100°C.}$ =20–180) can be used, the preferred range is $ML_{4,100°C.}$ =35–110; examples include solution SBR, polybutadiene, EPDM, EP, etc.

The solvent removed by desolventization can be water, or an organic solvent such as hexane, cyclohexane, toluene, ligroin, each of the later having a boiling point or azeotrope temperature less than that of boiling water.

The following examples are representative and fully illustrate the practice of the present invention, both as to product and process. All parts are by weight percent except as otherwise specified.

EXAMPLE 1

Carbon black was ground (fluffed) in $H_2O$ (180 g. carbon black in 2130 g. $H_2O$) (8% w/w) (90 phr) and mixed (at 22° C.) with a hydrocarbon solution of 200 g. SBR ($ML_{4,100°C.}$ =110) (DSV =2.7) rubber (15.1% w/w) containing 1 g. (0.5 phr) Triton CF 54 low foaming nonionic surfactant (polyether alcohol with blocked terminal hydroxyl group).

The resulting liquid two-phase dispersion of hydrocarbon solvent/rubber/carbon black and water was stripped of its hydrocarbon solvent component by adding the dispersion (at a rate of about 360 g. min.) to vigorously agitated hot (80°–120° C.) water. The resulting powdered rubber was isolated by filtration and dried. Mean particle size of powdered material was 1.05 mm. (half above 1.05 mm.) and the particles were clean (i.e., little or no free carbon black) to the touch. There was no visible discontinuity between carbon black and rubber even after storage for about one year. Such a composition has a low ash content, 0.12%, because no inorganic material was used as a precipitating or partitioning agent.

EXAMPLE 2

The method of Example 1 was repeated with other modified low foaming nonionic surfactants of the Triton CF series and compared to preparations using conventional polyether alcohol surfactants such as those of the Triton X series (Table I).

It can be seen from Table I that increasing the HLB (hydrophil elipophile balance) of the surfactant tends to decrease the particle size of the rubber powder. However, increasing the HLB of conventional polyether alcohol surfactant also tends to increase deleterious foam formation. Consequently, the use of low foaming modified nonionic surfactants (polyether alcohols with blocked terminal hydroxyl groups) best balanced the desired fineness of particle size with a minimization of undesirable foam formation.

EXAMPLE 3

The method of Example 1 was repeated with the carbon black level being varied from 5–90 phr. Those materials which contained 60 phr carbon black or greater resulted in powders with a mean particle size > 0.8 mm. and < 1.5mm. Those materials with a mean particle size > 1.5mm. were crumb, and were not suitable for powder blending.

EXAMPLE 4

The method of Example 1 was repeated with the mixing temperature being varied from about 20°–100° C. and the rubber solution (cement) concentration was varied from about 15–25% (w/w). Examples of such powders were characterized by mean particle sizes from about 0.8–1.4 mm. In this example, increasing the surfactant concentration from 0.5 to 5.0 phr resulted in particle size reductions of up to about 20%.

EXAMPLE 5

The method of Example 1 was repeated except that a low Mooney ($ML_{4\,100°C}$ =35) polybutadiene rubber (DSV = 2.0) was substituted for high Mooney SBR ($ML_{4\,100°C}$ = 110) (DSV = 2.7). The mean particle size of the resulting rubber powder was 1.08 mm.

EXAMPLE 6

The method of Example 1 was repeated except that the rate of addition of the rubber/black dispersion to the hot water was increased to about 1270 g./min.; this resulted in the formation of surprisingly hard and dense powdered rubber particles. These materials were especially resistant to compacting under pressure and were thus particularly useful when long term storage under pressure was necessary. (Table II).

EXAMPLE 7

The method of Example 1 was repeated with Triton X400 (a long chain > 25 carbon atom cationic surfactant) was substituted for Triton CF 54. The use of this surfactant surprisingly produced hardened powdered rubber particles even at a slow addition rate (about 367 g./min.) (Table II).

EXAMPLE 8

The method of Example 1 was repeated with a mixture of low foaming surfactants (Triton CF 54), blocked polyether alcohol, and Triton X400, (cationic with greater than 25 carbon atoms) being substituted for Triton CF 54. This material had intermediate density and hardness similar to materials prepared according to Examples 1 and 7 (Table II).

EXAMPLE 9

The powdered rubber particles prepared according to Examples 1–8 were dry blended (powder compounded) with conventional pigment, oil, and curative in a 4 liter Waring Blender or a 9 liter Henschel Mixer, for 2.5–3.5 minutes at mixing speeds of from about 1000–5000 RPM. The jacket of the mixer was cooled by cold water (8°–18° C.). Experimental tire tread recipes were used, that is from 70–90 phr carbon black, 45–60 phr oil, 0.1–10 phr pigments, and 0.1–10 phr curatives. [G. Crane, E. L. Kay, Rubber Chem. Technol. 48 (1) 50 (1975)].

Pigments which can be utilized include protective materials such as waxes, antioxidants, etc.; curatives which can be utilized include sulfur, accelerators and activators, etc. The resulting compositions are powdered rubber total compounds. Such materials can be processed in a variety of ways such as milling, Banbury mixing and most surprisingly by direct extrusion without prior compacting or milling, using simple single screw rubber extruders (low L/D ratios).

EXAMPLE 10

A powdered compound prepared according to Example 9 was milled (60° C.) for about 12 passes and cured at 149° C. The physical properties are shown in Table III.

EXAMPLE 11

A powdered compound prepared according to Example 9 was Banbury mixed using only a final Banbury mix cycle (2 min. at 135° C.). The physical properties of the vulcanizate are shown in Table IV.

EXAMPLE 12

A powdered compound prepared according to Example 9 was extruded on a Clinefelter single screw ribbon tread extruder (L/D = 11/1, compression ratio 2:1) (a simple rubber extruder) to form tire treads. A screw speed of 100 r.p.m. and an extrusion temperature of 60° C. was used. The powder was poured directly into the extruder without any prior compacting or milling. Vulcanizate properties for this material are shown in Table V.

EXAMPLE 13

Tire treads prepared according to Example 12 were wear tested on a moderate wear course (40 km./.01 mm.). The automobile was run at 97 km./h. The wear results are shown in Table VI. Even though, the powdered compound was never milled or Banbury mixed, tires produced therefrom are essentially as long wearing as conventional high energy mixed rubber compounds.

TABLE I

PARTICLE SIZE VS. NONIONIC SURFACTANT TYPE

| Surfactant (0.5 phr) | HLB[a] | Mean Particle Size (mm.) | Ross-Miles Foam Height (0.1%)[a,b] | |
|---|---|---|---|---|
| | | | Initial | 5 min. |
| Triton X15 | 3.6 | 1.72 | — | — |
| Triton X45 | 10.4 | — | 16.0 | 10 |
| Triton X100 | 13.5 | 1.05 | 110 | 25 |
| Triton CF10 | 14.0 | 0.88 | 9.0 | 4.0 |
| Triton CF32 | — | 0.95 | 6.0 | 0.2 |
| Triton CF54 | 13.6 | 1.05 | 15.0 | 10.0 |

[a]Rohm and Haas Surfactants/Handbook of Physical Properties, CS-16 6/aj
[b]ASTM D1173-53

TABLE II

PRESSURE COMPACTIBILITY OF POWDERED RUBBERS[a]

| Example No. | Density, (bulk) kg/m³ | v/v % at 70 kPa | v/v % at 550 kPa |
|---|---|---|---|
| 1 | 205 | 36 | 59 |
| 6 | 400 | 8 | 25 |
| 7 | 410 | 4 | 16 |
| 8 | 333 | 9 | 20 |

[a]Tested in a metal cylinder 1.25 cm in diameter; pressures applied for 15 min. at 22° C.

TABLE III

| | Powder Example 10 | Bale Control |
|---|---|---|
| Monsanto Rheometer[a] | | |
| TS (2) min. | 6.6 | 8.5 |
| TC (90), optimum cure, min. | 18.6 | 20.3 |
| Initial Plasticity, dN · m | 12.1 | 10.2 |
| Normal Stress Strain[b] | | |
| $\sigma F$, MPa | 16.5 | 17.7 |
| $\sigma 300$, MPa | 8.27 | 8.27 |
| $\epsilon$, % | 510 | 540 |
| Shore "A" Hardness[c] | 64 | 59 |
| Steel Ball Rebound[d] | | |

TABLE III-continued

|  | Powder Example 10 | Bale Control |
|---|---|---|
| % at 23° C. | 33 | 37 |

* 149° C., 1.78 crad, 100 revolutions/min., ASTM D2705
<sup>b</sup>Cured 23 min. at 149° C., ASTM D3196
<sup>c</sup>Cured 30 min. at 149° C., ASTM D2240
<sup>d</sup>Cured 30 min. at 149° C., ASTM D2632

TABLE IV

|  | Powder Example 11 | Bale Control |
|---|---|---|
| Monsanto Rheometer,<sup>a</sup> |  |  |
| TS(2), min. | 6.7 | 8.5 |
| TC(90), optimum cure, min. | 15.0 | 20.0 |
| Normal Stress Strain<sup>b</sup> |  |  |
| σF, MPa | 16.6 | 17.2 |
| σ300, MPa | 8.27 | 7.58 |
| ε, % | 520 | 520 |
| Shore "A" Hardness<sup>c</sup> | 64 | 61 |
| Steel Ball Rebound<sup>d</sup> | 28 | 33 |

<sup>a</sup>149° C., 1.78 crad, 100 revolutions/min., ASTM D2705
<sup>b</sup>Cured 23 min. at 149° C., ASTM D3196 <sup>c</sup>Cured 30 min. at 149° C., ASTM D2240 <sup>d</sup>Cured 30 min. at 149° C., ASTM D2632

TABLE V

|  | Powder Example 12 | Bale Control |
|---|---|---|
| Monsanto Rheometer<sup>a</sup> |  |  |
| TS(92), min. | 9.8 | 9.5 |
| TC(90), optimum cure, min. | 20.8 | 23.0 |
| Initial Plasticity, dN · m | 14.7 | 12.1 |
| Normal Stress Strain<sup>b</sup> |  |  |
| σF, MPa | 16.5 | 15.2 |
| σ300, MPa | 9.65 | 8.27 |
| ε, % | 500 | 520 |
| Shore "A" Hardness<sup>c</sup> | 65 | 67 |
| Rebound at 23° C.<sup>d</sup> | 35 | 33 |
| Running Temperature, ° C.<sup>e</sup> | 182 | 232 |
| Stanley London<sup>f</sup> | 37 | −38 |
| γMI<sup>g</sup> | −38 | −38 |

<sup>a</sup>149° C., 1.74 crad, 100 revolutions/min., ASTM D2705
<sup>b</sup>Cured 23 min. at 149° C., ASTM D3196
<sup>c</sup>Cured 30 min. at 149° C., ASTM D2240
<sup>d</sup>Cured 30 min. at 149° C., ASTM D2632
<sup>e</sup>Cured 35 min. at 149° C., ASTM D623
<sup>f</sup>Cured 30 min. at 149° C., tested on medium coefficient (44) Glass, ASTM E-303 Part II.
<sup>g</sup>Cured 30 min. at 149° C., ASTM D797

TABLE VI

Belted Bias Tire Test, H78-15, Moderate Wear Course

|  | Powder Example 13 | Bale Control |
|---|---|---|
| km/.01 mm at 19,300 km All Grooves Wear | 36.8 | 39.9 |
| Rating at 19,300 km | 92.0 | 100 |
| Relative Wear Difference for 90% Confidence | ± 7.0 | — |

Vulcanizate properties, as illustrated in the preceding representative examples, reflect a desirable scorch safety factor, significantly high tensile, rebound and hardness properties.

The preceding examples can be varied within the context of this total specification as it would be interpreted by one skilled in the art to achieve substantially the same results.

The novel, homogeneous, storage-stable dry blendable hydrocarbon solution rubber powders of this invention contain carbon black, hydrocarbon solution rubber, and, foam inhibiting surfactant, said solution powders are of a mean particle size from 0.8 to 1.5 mm., about one-half of said particles having a particle size greater than 1.0 mm.; total powder blends thereof are part of this invention as are their respective preparations.

Specifically, the novel homogeneous, storage-stable, dry blendable hydrocarbon solution rubber powders containing carbon black can be defined as those consisting essentially of (a) 100 parts by weight hydrocarbon solution rubber having a DSV of from about 1.5 to about 7.0, (b) from 50 to 150 parts by weight carbon black, and, (c) from 0.01 to 5.0 parts by weight of at least one foam inhibiting surfactant selected from the group consisting of (1) nonionic polyether alcohols with blocked terminal hydroxyl group, and, (2) cationic tetraalkylammonium salts having more than 25 carbon atoms in the cation of said salt, said solution rubber powder being clean, free flowing and of a mean particle size from 0.8 to 1.5 mm., about one-half of said particles having a particle size greater than 1.0 mm.

A preferred composition is that homogeneous, storage-stable, dry blendable hydrocarbon solution rubber powder containing carbon black and consisting essentially of (a) 100 parts by weight hydrocarbon solution rubber having a DSV of about 2.7 (b) about 90 parts by weight carbon black, and, (c) 0.5 part by weight of at least one foam inhibiting surfactant, said surfactant being a nonionic polyether alcohol with blocked terminal hydroxyl group, said solution rubber powder being clean, free flowing and of a mean particle size from 0.8 to 1.5 mm., about one-half of said particles having a particle size greater than 1.0 mm.

Another preferred composition is that homogeneous, storage-stable, dry blendable hydrocarbon solution rubber powder containing carbon black and consisting essentially of (a) 100 parts by weight hydrocarbon solution rubber having a DSV of about 2.7 (b) about 90 parts by weight carbon black, and, (c) 0.5 part by weight of at least one foam inhibiting surfactant, said surfactant being a cationic tetraalkylammonium salt having more than 25 carbon atoms in the cation of said salt, said solution rubber powder being clean, free flowing and of a mean particle size from 0.8 to 1.5 mm., about one-half of said particles having a particle size greater than 1.0 mm.

Totally compounded rubber powder can be prepared from the above hydrocarbon solution rubber powder and consists essentially of: (a) 100 parts by weight hydrocarbon solution rubber having a DSV of from about 1.5 to about 7.0; (b) from 50 to 150 parts by weight carbon black; (c) from 0.01 to 5.0 parts by weight of at least one foam inhibiting surfactant selected from the group consisting of (1) nonionic polyether alcohols with blocked terminal hydroxyl group, and, (2) cationic tetraalkylammonium salts having more than 25 carbon atoms in the cation of said salt, this powder composition consisting essentially of said (a), (b), and (c) being clean and free-flowing; (d) from about 45 to about 60 phr oil, and, (e) from about 0.1 to about 20 phr, collectively, of at least one pigment, at least one preservative and at least one curative.

The present invention also encompasses the process for preparing homogeneous, storage-stable, dry-blendable, hydrocarbon solution rubber powder having a DSV from about 1.5 to about 7.0 (100 parts) containing carbon black, said process being carried out by sequentially (1) grinding carbon black (60–90 phr) in water, (2) mixing at a temperature of 20°–100° C., the composition resulting from said (1) with a hydrocarbon solution of rubber, about 5–25% (w/w), to form a two phase liquid dispersion of (a) hydrocarbon solvent, carbon black, rubber and (b) water, (3) stripping the liquid two phase dispersion of said (2) of solvent by adding, at a rate of between about 360–1270 g./min., said dispersion to vigorously stirred hot water (85–120° C.) in the presence of at least one foam inhibiting surfactant selected from the group consisting of (a) nonionic polyether alcohols with blocked terminal hydroxyl group (0.01–5.0 phr), and, (b) cationic tetraalkylammonium salts having more than 25 carbon atoms in the cation of said salt (0.01–5.0 phr), to produce powder, (4) drying said powder to produce a homogeneous, clean and free-flowing powder having a mean particle size from 0.8 to 1.5 mm., with about one-half of said particles having a particle size greater than 1.0 mm.

The method for preparing homogeneous, storage-stable and dry-blended totally compounded rubber powder is part of this invention and is that process wherein (A) a homogeneous, storage-stable, dry-blendable, hydrocarbon solution rubber powder having a DSV of from about 1.5 to about 7.0 (100 parts) containing carbon black is prepared by sequentially (1) grinding carbon black (60–90 phr) in water, (2) mixing the composition resulting from said (1) with a hydrocarbon solution of rubber to from a liquid two phase dispersion of (a) hydrocarbon solvent, carbon black, rubber, and (b) water, (3) stripping the liquid two phase dispersion of said (2) of solvent by adding said dispersion to vigorously stirred hot water (85–120° C.) in the presence of at least one foam inhibiting surfactant selected from the group consisting of (a) nonionic polyether alcohols with blocked terminal hydroxyl group (0.01–5.0 phr), and, (b) cationic tetraalkylammonium salts having more than 25 carbon atoms (0.01–5.0 phr), to produce powder, (4) drying the powder of said step (3) to produce a homogeneous, clean and free-flowing powder having a mean particle size from about 0.8 to about 1.5 mm., with about half of said particles having a particle size greater than 1.0 mm., followed by, (B) dry-blending, powder compounding, for about 2.5 to about 3.5 min. at 1000–5000 r.p.m., the solution powder product of said (A) with from about 45 to about 60 phr oil, and, from about 0.1 to about 20 phr, collectively, of at least one pigment, at least one preservative and at least one curative, to produce said totally compounded rubber powder.

What is claimed is:

1. Process for preparing homogeneous, storage-stable, dry-blendable, hydrocarbon solution non-polar rubber powder having a DSV from about 1.5 to about 7.0 (100 parts) containing carbon black, said process being carried out by sequentially (1) grinding carbon black (60–90 phr) in water (2) mixing at a temperature of 20°–100° C., the composition resulting from said (1) with a hydrocarbon solution of rubber, about 5–25% (w/w), to form a liquid two phase dispersion of (a) hydrocarbon, solvent, carbon black, and rubber, and (b) water; (3) stripping the liquid dispersion of said (2) of solvent by adding, at a rate of between about 360–1270 g./min., said dispersion to vigorously stirred hot water (85–120° C.) in the presence of at least one foam inhibiting surfactant selected from the group consisting of (a) nonionic polyether alcohols with blocked terminal hydroxyl group (0.01–5.0 phr), and, (b) cationic tetraalkylammonium salts having more than 25 carbon atoms in the cation of said salt (0.01–5.0 phr), to produce powder, (4) drying said powder to produce a homogeneous, clean and free-flowing powder having a mean particle size from 0.8 to 1.5 mm., with about one-half of said particles having a particle size greater than 1.0 mm.

2. Process for preparing homogeneous, storage-stable and dry-blended totally compounded rubber powder in which process, (A) a homogeneous, storage-stable, dry-blendable, hydrocarbon solution non-polar rubber powder having a DSV of from about 1.5 to about 7.0 (100 parts) containing carbon black is prepared by sequentially (1) grinding carbon black (60–90 phr) in water, (2) mixing the composition resulting from said (1) with a hydrocarbon solution of rubber to form a two phase liquid dispersion of (a) hydrocarbon solvent, carbon black, and rubber, and (b) water, (3) stripping the liquid dispersion of said (2) of solvent by adding said dispersion to vigorously stirred hot water (85–120° C.) in the presence of at least one foam inhibiting surfactant selected from the group consisting of (a) nonionic polyether alcohols with blocked terminal hydroxyl group (0.01–5.0 phr), and, (b) cationic tetraalkylammonium salts having more than 25 carbon atoms (0.01–5.0 phr), to produce powder, (4) drying the powder of said step (3) to produce a homogeneous, clean and free-flowing powder having a mean particle size from about 0.8 to about 1.5 mm., with about half of said particles having a particle size greater than 1.0 mm., followed by, (B) dry-blending, powder compounding, for about 2.5 to about 3.5 min. at 1000–5000 r.p.m., the solution powder product of said (A) with from about 45 to about 60 phr oil, and, from about 0.1 to about 20 phr, collectively, of at least one pigment, at least one preservative and at least one curative, to produce said totally compounded rubber powder.

* * * * *